INVENTOR
Maurice Boffe

BY Spencer & Kaye
ATTORNEY

United States Patent Office 3,730,871
    Patented May 1, 1973

3,730,871
    APPARATUS FOR MODIFYING A PROPERTY OF AN ARTICLE BY DIFFUSION
    Maurice Boffe, Fleurus, Belgium, assignor to Glaverbel S.A., Watermael-Boitsfort, Belgium
    Continuation of abandoned application Ser. No. 722,379, Apr. 18, 1968. This application Apr. 8, 1971, Ser. No. 132,595
    Claims priority, application Luxembourg, Apr. 27, 1967, 53,530; Great Britain, Jan. 15, 1968, 2,167/68
    Int. Cl. C22d 3/02; C03c 15/00
    U.S. Cl. 204—245                                    10 Claims

ABSTRACT OF THE DISCLOSURE

In processes wherein at least one property of a glass, vitrocrystalline or stone material is improved by the diffusion of a substance into the material from a medium communicating with the material, a method and apparatus for substantially improving the diffusion process by preventing nonuniform changes in the liquid medium adjacent the surface being treated due to random currents in the rest of the medium.

CROSS REFERENCE TO RELATED APPLICATION

This application is a continuation application of Ser. No. 722,379, filed Apr. 18, 1968, entitled Method and Apparatus for Modifying a Property of an Article by Diffusion now abandoned.

BACKGROUND OF THE INVENTION

The present invention relates to processes for modifying the physical and/or chemical property of articles made of glass, vitrocrystalline material or stone by the diffusion of at least one substance from a medium communicating with the material, and particularly to a method and apparatus for controlling variations in the diffusion reaction across the article surface being treated. The invention also relates to articles produced by such processes.

It is known that glass can be tempered chemically, i.e., compressive stresses can be produced, or existing compressive stresses can be increased, in one or more surface layers of the glass, by creating an ion exchange between such surface layers and a communicating medium, provided that the nature of the ions entering the glass and the temperature conditions prevailing during the ion exchange are appropriately selected.

The chemical tempering process can be of two types. According to one type of process, the ion exchange is performed at a temperature which is sufficiently high to cause stress relaxation to occur in the glass, while the ions entering the glass are such as to impart a lower coefficient of thermal expansion to the glass surface layers. According to the other type of process, ions already in the glass surface layers are replaced by larger ions and the ion exchange is effected at a temperature below the glass annealing point (which point corresponds to a viscosity of about $10^{13.2}$ poises) so that substantial stress relaxation does not occur.

The specific processes heretofore employed for carrying out these operations have not proven completely satisfactory, primarily due to the fact that they have not proven capable of producing predetermined results with any suitable degree of accuracy or repeatability. Although the general result in terms of stress distribution is predictable, it has been found that seemingly chance variations occur from one region to another of the treated glass, and from one process to another ostensibly performed under identical conditions.

SUMMARY OF THE INVENTION

It is a primary object of the present invention to eliminate these shortcomings.

Another object of the invention is to suppress random variations in the results produced by the diffusion process at different locations across the surface of the article being treated.

Still another object of the invention is to substantially improve the predictability of such processes.

The present invention is based on my discovery that unpredictable variations in the tempering effects produced by such processes are apparently due to random changes in the composition or movement of the bath liquid immediately adjacent the glass surfaces being treated. Such changes are seemingly due, at least to an appreciable extent, to random currents resulting at least partially from the ion diffusions themselves.

Whatever be the exact reasons for these random variations, I have found that the modification of the glass properties by such tempering processes can be controlled in a far more satisfactory manner if such random currents are eliminated or are prevented from influencing the bath liquid immediately adjacent the surfaces being treated.

The above and other objects according to the invention are achieved by a process for modifying a property of a material, chosen from the group consisting of glass, vitrocrystalline material and stone, by carrying out the steps of disposing the material in a diffusion bath constituted by a liquid medium for producing a diffusion of particles of one type from the bath into a surface of the material, and preventing nonuniform changes in the liquid medium adjacent such surface due to random currents in the rest of the bath. It is particularly desirable to prevent nonuniform changes to currents which occur spontaneously in the rest of the bath.

The objects according to the invention are also achieved by apparatus for the modification of a property of an article made of a material chosen from the group consisting of glass, vitrocrystalline material and stone, which apparatus includes a container for holding a diffusion bath of a molten salt in which the article is to be immersed, the bath constituting a source of ions which are to diffuse into the surface of the article so as to modify a property thereof, and means associated with the container for preventing nonuniform changes in the molten salt adjacent the surface due to random currents in the rest of the bath.

Finally, the objects of the invention are achieved by the provision of a material chosen from the group consisting of glass, vitrocrystalline material and stone and treated according to the novel process described above.

In the description of the process presented above, the term "particles" is intended to include molecules, atoms or ions, the improvements of the present invention being applicable to processes involving the diffusion of each of these specific types of particles.

Although glass has been until now primarily specified as the material being treated, particularly because the invention is mainly concerned with improvements in the known art of chemically tempering such material, and especially with improvements in chemical tempering processes involving an exchange of alkali metal ions, it should be mentioned that the novel features of the invention can also be usefully applied for promoting the diffusion of ions into vitrocrystalline materials having any degree of crystallization, and various types of stone, such as marble for example. Moreover, the present invention is not limited to processes in which ion migration takes place, but also extends to "cementation" processes in which atoms or molecules are introduced into the material being treated without any corresponding migration of atoms or molecules from this material occurring. One example of processes of this type is a process wherein atoms are introduced into the surface layer of the glass in order to improve its resistance to water.

DESCRIPTION OF THE PREFERRED EMBODIMENTS

Figure 1:
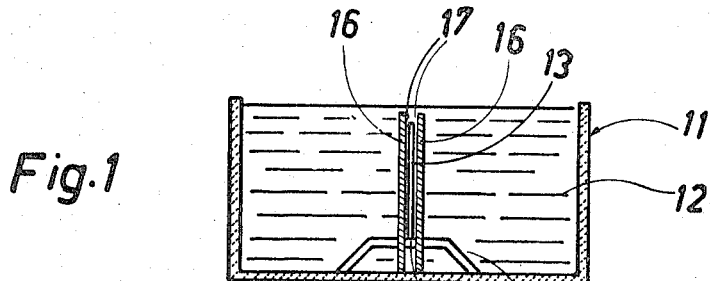
FIG. 1 is a simplified, elevational cross-sectional view showing one embodiment of the apparatus according to the present invention.

According to one preferred manner of carrying out the present invention, a quantity or quantities of the liquid medium immediately adjacent the surfaces of the material under treatment into which diffusion is to take place are sheltered from the disturbing effects of random currents in the remainder of the bath. In addition, the liquid medium immediately adjacent the material under treatment can be continuously and positively displaced and replaced by liquid from other portions of the bath, this displacement being effectuated in a uniform manner so as to prevent the occurrence of any nonuniform movements.

According to another preferred manner of achieving the results of the present invention, random currents having the undesirable effects discussed previously can be at least substantially completely eliminated by maintaining the liquid medium in a state of agitation, which agitation can be accomplished by means of a propeller or other agitator in the bath, or by displacing the material undergoing treatment relative to the container holding the bath of liquid medium. Such relative displacement can be produced by, for example, rotational movement of the article in the bath, rotational or other movement of the container, or simultaneous movement of the article and the container. Any one of these types of agitation can, if it is made sufficiently energetic, effect a continuous recycling of the liquid medium in direct contact with the material so as to suppress random changes in the composition of this liquid. In addition, the agitation prevents the occurrence of random diffusion currents near the material due to significant differences in composition between the layers of liquid medium immediately adjacent the material surface and portions of the medium disposed further from the material. Such differences in composition are due to the enrichment of the layers of the liquid medium adjacent the materials in ions migrating from the material or the impoverishment of such layers of the medium in ions which diffuse into the material. Such compositional unbalances between different regions of the medium appear to be a major cause of the undesirable random variations in treatment effects which occur in the chemical tempering processes as heretofore carried out. Moreover, agitation of the liquid medium can serve to maintain a dispersed solid phase in a state of suspension, if such a dispersed solid phase is present in the medium.

In preferred embodiments of the present invention, diffusion into the material being treated takes place, at least at one surface thereof, from a bath of liquid medium, while the whole or part of such surface is in contact with, or slightly spaced from, a screen or wall which shelters the liquid in contact with the surface from displacement under the influence of random currents in the bath.

To mention one specific example, a surface of an article being treated may be disposed, during treatment, at a small distance from a sheltering screen or wall. The layer of liquid between the surface and the screen or wall will be sheltered from disturbances due to any possible random currents, and particularly those which occur spontaneously during the course of the process, in other portions of the liquid medium, which currents might be due to thermal effects, vibrations or other causes. Moreover, while the composition of the liquid layer next to the article surface will, during the treatment process, become modified and hence be different from that of the remainder of the bath, the sheltering screen or wall will prevent such differences in composition from creating diffusion currents between the dissimilar portions of the medium and consequent random changes in the composition of the liquid immediately adjacent the article. The spacing of such screen or wall from the article surface can be greater than the thickness of the liquid layer from which the immediate diffusion of ions into the article occurs. Such liquid layer is relatively thin, generally being of the order of 1 mm. or less.

The present invention includes various types of apparatus for carrying out the various types of diffusion process discussed above, which apparatus generally includes a container for holding a bath of molten salt which constitutes a source of the ions which are to diffuse into the surface of the article being treated, the container also being arranged for receiving an article which is to be immersed in such bath and for permitting the subsequent removal of that article.

Embodiments of apparatus according to the invention further include heating means for maintaining a bath of molten salts in molten condition in the container, and means for sheltering a quantity of molten salt immediately adjacent a surface of an article being treated from displacement under the influence of random currents in a molten salt bath. Additionally, or alternatively, the apparatus may include means for causing a continuous positive displacement of the quantity of molten salt and replenishment thereof by liquid from other portions of the bath. For this purpose, the apparatus may include an agitator for acting directly on the molten salts and/or means for displacing the container and/or means for displacing the article during the treatment process. The apparatus may also include a pump or other means for maintaining a predetermined current of the liquid medium in the container and/or means for exercising a cooling action on a local zone or zones of the bath.

According to one embodiment of the invention, the article to be treated is in the form of a sheet which is disposed vertically so that one or both faces of the sheet are spaced a small distance from a respective vertical wall, there being a thin layer of the bath liquid in the space between each article surface and the adjacent wall and some arrangement being provided for permitting the liquid in these spaces to communicate with the remainder of the bath. In such arrangements, an upward or downward current will be produced in each liquid layer as the diffusion proceeds. Thus, in the course of an ion exchange process, if ions in the medium become replaced by heavier ions from the sheet, descending currents will be produced in the spaces between the sheet and the walls, while ascending currents will result if the ions from the sheet are lighter in weight than the ions diffusing into the sheet.

However, due to the presence of the walls adjacent the sheet surfaces, the resulting currents will be uniform since they will not be disturbed by any irregular currents which may arise at various levels in the remainder of the bath. As a result, the diffusion process can be easily controlled.

Since the liquid layers from which diffusion takes place are undergoing an ascending or descending movement, the concentration in these liquid layers of the ions being diffused into the sheet will vary in the direction of such ascending or descending motion. This will result in a gradient in the effect of the diffusion treatments along the surfaces of the sheet. However, it has been found that the value of such gradient can be predetermined and that the existence of such gradient can be advantageous in certain types of articles.

Certain specific embodiments of the present invention will be described in detail below with reference to the accompanying drawings.

In the different figures of the drawings, now to be described in detail, corresponding parts are designated by the same reference numerals.

FIG. 1 shows a tank 11 which can be disposed in a furnace (not shown). The tank can be made of metallic, ceramic or other refractory material, e.g. rust-resistant steel. The tank 11 contains a bath 12 containing potassium ions to be introduced into a sheet of plate or sheet glass 13 in exchange for sodium ions originally present in the sheet. The bath preferably comprises a molten potassium salt, e.g. almost pure potassium nitrate.

The sheet 13 is disposed with its bottom edge 15 on two spaced local supports 14 which are spaced from one another in a direction perpendicular to the plane of the drawing so that only one of them is here visible. The supports 14 carry two vertical plates 16 whose length and breadth dimensions are greater than those of the sheet 13. The spacing between these plates can be adjusted by any suitable means which is not shown. The spacing is preferably set so that the plates are spaced a small distance, e.g. a few millimeters, from the respective opposing faces of the sheet 13.

The ion exchange, which leads to a toughening of the glass, can be carried out in the temperature range 300°–550° C., and preferably at a temperature of about 450° C. As the ion exchange proceeds, the layers of molten salt occupying the narrow spaces 17 between the sheet 13 and the plates 16 become enriched in sodium ions and impoverished in potassium ions. The sodium ions are lighter in weight than the potassium ions so that the medium in the spaces 17 becomes less dense than the medium in the rest of the bath and, as a result, ascending currents are created in the spaces 17.

The plates 16 shield the essentially planar rising currents in spaces 17 from disturbance by random currents in the remainder of bath 12 and prevent the occurrence of the lateral diffusion currents which would otherwise occur between the liquid in immediate contact with the sheet 13 and the main body of the medium under the influence of the difference in the potassium and sodium ion concentrations.

The toughening treatment therefore proceeds, without being subjected to haphazard variations, over the whole area of the sheet 13. Any given portion of the medium in one of the spaces 17 becomes progressively enriched in sodium ions as it rises in the space and, in consequence of this fact, there is a uniform gradient in the degree of tempering of the sheet 13 from the bottom to the top of the sheet.

Although the embodiment shown in FIG. 1 has been described with reference to a glass tempering treatment involving the substitution of potassium for sodium ions at a temperature below the annealing point of the glass, the same apparatus can be used for performing a different type of tempering treatment wherein lithium ions are substituted for sodium ions at a temperature above the annealing point of the glass, e.g. at a temperature of about 600° C. Also other treatments may be performed with the apparatus. To cite another example, replacement of ions in the glass by smaller ions, such as lithium ions, at a temperature below the glass annealing point, or by larger ions, such as potassium ions, at a temperature above the annealing point, can be effectuated and, if carefully controlled, will lead to the production of microcracks in the glass which gives the glass a milky appearance and enables the glass article to be very readily bonded with, or sealed to, another article of glass or of some other material.

Any regular ascending or descending current along the surface of an article being treated can be produced, or augmented, by a pumping system or by producing thermal convection currents in such liquid layers. For example, convection currents could be created by one or more heating sources disposed along the current paths or underneath the molten bath container. Similarly, descending currents can be augmented by a cooling action. On the other hand, it may be mentioned that the strength of any such currents along the surface of the article being treated will be dependent upon the viscosity of the molten bath medium and that such viscosity can be increased in various ways such as, for example, by incorporating particulate solid material in suspension, so as to decrease the magnitude of such currents. Certain of the techniques just mentioned are incorporated in the embodiment of FIG. 2.

Figure 2:
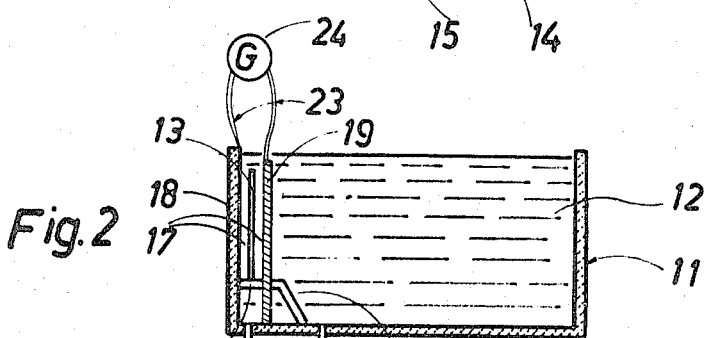
FIG. 2 is a view similar to that of FIG. 1 showing another embodiment of such apparatus.

In FIG. 2, the glass sheet 13 to be treated is located between two walls 18 and 19, one of which, wall 18, is a wall of the tank 11. The wall 19 extends across the full width of the tank so as to define with the wall 18 a thin region open only at the bottom and top. The intake and delivery conduits 20 and 21, respectively, of a pump 22 communicate with the interior of the tank at locations such that the liquid medium can be maintained in circulation upwardly through the thin region. In this way, the upward currents of the medium in the spaces 17 in contact with the sheet 13 can be regulated to produce a predetermined gradient of stresses in the sheet. By increasing the speed of the upward currents, the rate of ion exchange can be increased because the spaces 17 will then be more quickly replenished with potassium ions, if the medium contains such potassium ions.

The walls 18 and 19 contain electrical resistance heaters and are connected by conductor wires 23 to an electric power generator 24. When the heating current is switched on, the upward currents in spaces 17 are accelerated by the heating effect. Such heating can be used to supplement, or even replace, the action of the pump.

The sheltering means shown in FIGS. 1 and 2 can be constituted by solid walls or perforated screens. A suitable screen could be made of a refractory fabric provided with perforations or meshes which are sufficiently small to shield the liquid layers between the screens and the article being treated from the influence of any random currents in the remainder of the bath.

The amount of diffusion occurring during a given period of time can be increased by creating an electric field which extends across the surface or surfaces into which the diffusion is to take place. Such a field can be generated between electrodes in the liquid medium bath. The article being treated can itself serve as an electrode if, for example, it is sufficiently warm to be electrically conductive.

Figure 3:
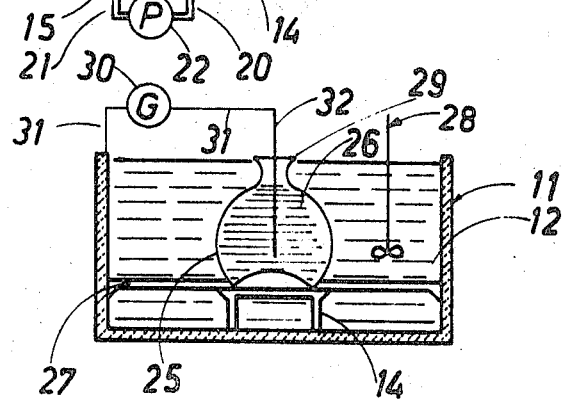
FIG. 3 is a view similar to that of FIG. 1 showing a further embodiment of such apparatus.

In FIG. 3, a glass flask 25 is shown in the process of being tempered in the bath 12. A quantity of liquid medium, denoted 26, is present inside the flask 25 so that ion exchange can take place at the inside as well as the outside surface thereof. The medium 26 inside the flask can be of the same composition as the medium forming bath 12, or it can be of a different composition. The flask is held firmly on a support 14 by arms 27.

During processing, a propeller 28 is rotated in the bath 12 so that the liquid in direct contact with the outside surface of the flask is continuously and positively replaced. In the absence of such agitation, currents rising in contact with the article would tend to result in variations in the degree of tempering from one part of the article to another. The treatment can be accelerated by establishing an alternating low-frequency electric field, having a frequency of 20 Hz. for example, across the interfaces between the glass and the contacting quantities of liquid media. In the illustrated embodiment, this field is generated by a generator 30 which is connected on the one hand to the bath 12 by a conductor wire 31, and on the other hand to an electrode 32 immersed in the medium 26 inside the flask.

Another possible way of sheltering the liquid which is in direct contact with an article surface from the effects of random currents in the remainder of the molten bath is by placing at least parts of the screen or wall in direct contact with the article surface while ensuring that at least a film of the liquid is maintained in contact with the article surface. A perforated or porous screen, for example a refractory fabric screen, may be employed so as to permit liquid to be in contact with the article surface not only in the space between the article and the solid portions of the screen, but also in the regions of the screen perforations. The liquid in such perforations is effectively sheltered from the effects of random diffusion currents, and the occurrence of liquid currents along, and in contact with, the article surface is suppressed.

When the articles to be treated are in sheet form, two or more such articles can be treated simultaneously by stacking them in the bath one adjacent the other or in contact with or adjacent intervening sheltering walls or screens. It is of course essential that at least a film of the diffusion liquid be present and be maintained against each surface to be treated so that if the articles to be treated have perfectly flat surfaces, the process can not be performed if the articles are held directly against one another. However, adjacent sheets can then be spaced slightly apart so as to define between themselves an intervening thin space which can contain a thin layer of liquid medium which will be sheltered from random currents in the remainder of the bath by the articles themselves.

If, during the course of a diffusion process according to the invention, an article surface into which particles diffuse from the bath is associated with a sheltering wall or screen which contacts such surface only at certain locations, the article surface will be exposed to a selective or differential diffusion phenomenon. This can prove to be advantageous in certain cases. For example, this can permit a sheet of glass to be chemically tempered to a degree which varies over its surface so as to achieve a predetermined distribution pattern of the resulting compressive stresses. If the chemical tempering takes place wholly or predominantly along intersecting series of lines which together form a screen pattern, the sheet of glass, when broken will shatter into fragments whose size depends on the mesh size of such pattern.

Such a differential action can be created, for example, by using a perforated or apertured sheltering wall in contact with an article surface during the treatment thereof, this causing the diffusion to be greater at the locations of the perforations than elsewhere. The liquid within the perforations or apertures will be sufficiently sheltered if these perforations or apertures are not too large. Weak eddy or convection currents may be produced in this liquid and may contact the article surface. However, they will be localized at the perforations or apertures and hence will not influence the treatment of the article in a random manner.

Figure 4:
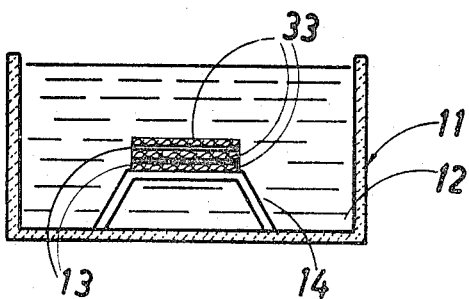
FIG. 4 is a view similar to that of FIG. 1 showing still another embodiment of such apparatus.

In FIG. 4, two glass sheets 13 are placed in the bath 12 between layers 33 of a glass fiber fabric or other material capable of withstanding the conditions existing in the bath. In consequence, ion exchange occurs between the surfaces of the glass sheets and the limited quantities of liquid present as thin layers between the sheets 13 and the fabric and in the interstices of the fabric. These quantities of liquid are entirely sheltered from the influence of any stray currents in the bath.

A very uniform tempering over the whole area of the sheets can be achieved if the mesh of the fabric is sufficiently fine. By using a relatively coarse fabric, a differential tempering effect can be achieved which will result in a spontaneous division of the sheet of glass into small non-cutting fragments if the glass should become broken. This property is of importance for vehicle windshields as well as other articles.

Figure 5:
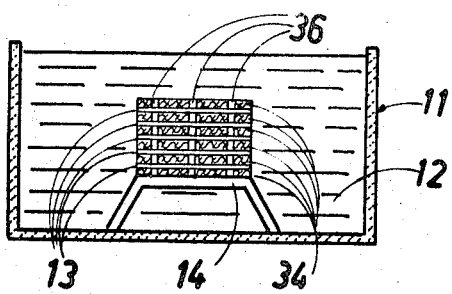
FIG. 5 is a view similar to that of FIG. 1 showing yet another embodiment of such apparatus.

Even more of a differential tempering can be achieved by maintaining the surfaces of the sheets 13, during the treatment, in contact with layers of fabric or other material provided with relatively large perforations to place certain regions of the sheets 13 in communication with larger quantities of treating liquid. Such an embodiment is illustrated in FIG. 5 in which several glass sheets 13 are placed in the bath 12 between successive plates 34, provided with perforations 36. The size of the perforations can be selected to conform closely with the required fragmentation size of the glass sheets.

A nonuniform, but predetermined, distribution of the sheltered liquid medium in contact with an article surface can also be achieved by using an unperforated contacting wall having a suitable shape, such as a corrugated wall or a wall which is shaped with respect to the article surface so as to define therewith a series of distributed pockets for holding portions of the liquid medium. The extent to which diffusion takes place in the regions of the pockets depends, among other things, on their depth. The shallower the pockets, the more rapidly will the ions which diffuse into the article become depleted. In those cases where two or more articles are to be treated simultaneously while in contact with an intervening spacer sheet or sheets, such spacer sheets can also be unperforated and can be shaped to contact the article surfaces only at certain points. Alternatively, the pockets for the portions of liquid medium can be defined by mutually facing surfaces of adjacent articles and a perforated or apertured spacer sheet sandwiched between them.

Figure 6:
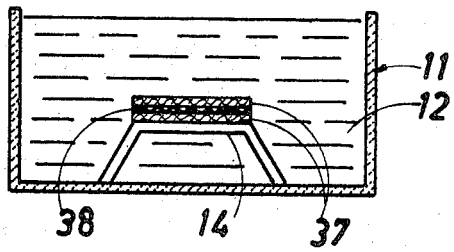
FIG. 6 is a view similar to that of FIG. 1 showing a still further embodiment of such apparatus.

FIG. 6 shows an embodiment in which flat plates 37 are located in the tempering bath on opposite sides of a sheet of patterned glass 38. Since the surfaces of the patterned glass are not flat, the liquid medium has access to the glass surfaces between the glass sheet 38 and the plates 37 and the small quantity of liquid which thus contacts the glass is sheltered from disturbance by any random currents which may exist in the bath.

Figure 7:
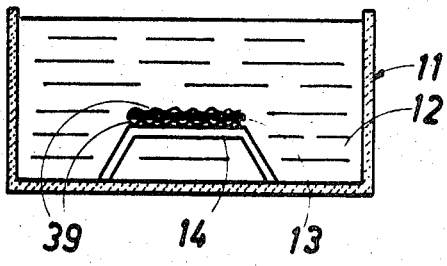
FIG. 7 is a view similar to that of FIG. 1 showing one more embodiment of such apparatus.

FIG. 7 shows an embodiment in which a glass sheet 13 to be tempered is located between two corrugated plates 39. Instead of using corrugated plates, use may be made of plates which are dimpled or otherwise formed so that they make contact with the surfaces of the glass sheet at a plurality of contact zones and so that the liquid medium will communicate with the glass surfaces in the regions between these zones.

Figure 8:
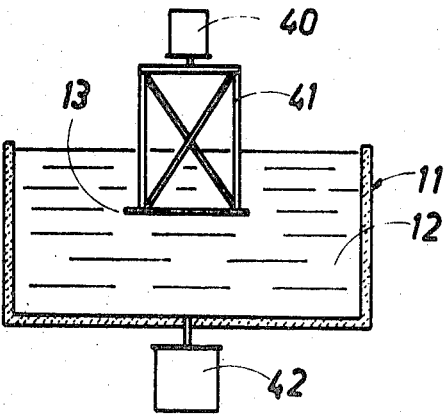
FIG. 8 is a view similar to that of FIG. 1 showing yet a further embodiment of such apparatus.

In the embodiment shown in FIG. 8, a glass sheet 13 to be tempered is held by a rotatable support 41 which is rotated by a motor 40. The sheet is kept in rotation in the bath 12 during the treatment. In this way, the whole body of liquid medium is kept in motion so that its composition is kept substantially uniform and a very uniform tempering of the sheet is achieved, the composition of the medium in immediate contact with the glass sheet being continuously renewed, or changed. Instead of, or in addition to, rotating the sheet which is undergoing treatment, the tank 11 can itself be rotated, as by a motor 42. If the motor 40 and support 41 are not provided or used, the sheet 13 to be treated can be supported directly in the tank 11. When relying on movement of the tank to achieve a uniform tempering, the movement should be nonuniform, e.g. it can be an intermittent rotation, to ensure that the bath is kept in continuous or substantially continuous movement relative to the tank and to the glass sheet undergoing treatment.

As has already been mentioned, the occurrence of random currents influencing the treatment of a glass or other article can be avoided by using a bath of sufficiently high viscosity. When using a sufficiently viscous medium, it may be unnecessary to place sheltering screens or walls in contact with, or adjacent, the surfaces into which the diffusion takes place, and inter-diffusion of ions can therefore occur, in directions normal to such surfaces, directly between the layers of medium in contact with those surfaces and the surrounding medium of the bath. By this spontaneous inter-diffusion the concentration of the ions to be donated in the layers of medium in contact with the article is maintained sufficiently high to prevent premature slowing down of the treatment. However, even when using a viscous medium in the form of a suspension, it may be necessary or desirable in some cases to stir or agitate the medium in order to maintain the dispersed phase in suspension.

Powdered carbon and silica have already been mentioned as examples of substances which can be incorporated in a treatment bath to raise its viscosity. Additional examples are glasses, such as, for example, borosilicate glasses, preferably potassium glasses, zeoliths, montmorillonites, bentonites, kaolins, micas such as muscovite, biotite, leucite, kaliopphylite and microcline, silica gels, gluaconite and phlologopite. The denser the liquid phase, the more readily can a stable suspension be formed. With this in view the liquid phase can include a small proportion, e.g. 0.5–1.2% by volume based on the volume of the molten potassium nitrate or other main constituents of the bath, of a heavy ingredient, e.g. barium nitrate, to increase the density of the liquid medium.

A substance incorporated in the bath for increasing its viscosity can be selected to serve additionally as an ion-exchange material which absorbs ions coming from the article under treatment and releases further quantities of the ions which are to be introduced into such material. For example, montmorillonites and bentonites, enriched with potassium or other ions, to be donated can be suspended in the liquid medium. Such ion-exchange materials can be replenished from time to time.

In the foregoing description relating to the drawings, the treatment of sheets of glass and hollow glassware has been particularly mentioned. However, pressed glass and articles of vitrocrystalline material and stone, e.g. marble, can be treated in similar ways.

In those cases where a flat article surface is to be treated while being maintained in a substantially vertical position in the bath, as shown in FIGS. 1 and 2 of the drawings, a contacting sheltering wall may be so shaped as to define, together with such surface, vertical flow paths along which the sheltered quantities of liquid medium can pass in the form of smooth laminar flows along, and in contact with, the article.

Another manner for eliminating or suppressing random currents in the bath is by giving the bath a substantially higher viscosity than has been heretofore employed for chemical tempering processes. A sufficiently high viscosity can be achieved by using a bath composed of a mixture of salts of a type which is completely solid at one temperature and completely liquid at a higher temperature, and which experiences a progressive variation in viscosity as its temperature passes through the range between these two temperatures. An example of such a bath is one composed of LiCl and NaCl in a molecular ratio of, for instance, 38:62, the viscosity of such a mixture being higher than that of LiCl alone. The particular mixture employed should be one that has the desired viscosity at the temperature at whch the particular treatment process is to be carried out. A sufficiently high viscosity can also be achieved by incorporating a substance or substances forming a dispersed solid phase, for example powdered carbon or silica. Such substances can be incorporated before the bath is placed into use or can be wholly or partially added in a continuous manner during the course of the process.

Among other diffusion processes which can be carried out according to the present invention are those in which powdered titanium or aluminum is incorporated in a bath and in which the surface layers of the article under treatment are penetrated by atoms of such metal. Other processes which can be carried out according to the invention are those in which atoms of helium or other rare gases are introduced into an article by means of a treatment bath which is supersaturated with such gas so as to present it in the form of small bubbles, or those processes in which molecules of a substance having a very high melting point, such as $BaCl_2$, for example, are introduced into the article.

As seen from the foregoing description, the process is performed in the presence or absence of an electric field. As electrolysis does not play an essential role with regard to the essence of the invention, non-electrolytic processes (and corresponding apparatus) are within the scope of the subject invention. Generally, liquid medium in contact with a surface of material being treated is in direct communication with medium contacting any other surface of the material and liquid in contact with any surface of the material is in direct communication with liquid contacting any other surface of the material.

It will be understood that the above description of the present invention is susceptible to various modifications, changes and adaptations, and the same are intended to be comprehended within the meaning and range of equivalents of the appended claims.

What is claimed is:

1. Apparatus for modifying a property of an article made of a material selected from the group consisting of glass, vitrocrystalline material and stone, comprising, in combination:
   (a) container means for holding an ion diffusion bath of a molten salt in which the article is to be immersed, the bath constituting a source of ions which are to diffuse into a surface of the article so as to modify a property thereof;
   (b) means at least partially surrounding the article disposed in the container means and including at least one partition arranged for sheltering a quantity of molten salt immediately adjacent the article surface from the influence of random currents in the bath; and
   (c) means inside said bath container means for producing a steady flow of the molten salt immediately adjacent the article surface.

2. An arrangement as defined in claim 1 wherein said partition is made of a refractory fabric.

3. An arrangement as defined in claim 1 wherein said partition is arranged to contact the article surface only at certain locations thereof.

4. An arrangement as defined in claim 1 further comprising electric field generating means for producing an electric field through said bath and across the surface being treated in order to promote the diffusion of ions into such surface.

5. An arrangement according to claim 1 wherein the partition is separated from, essentially parallel to and within a few millimeters of the article surface.

6. Apparatus for modifying a property of an article made of a material selected from the group consisting of glass vitrocrystalline material and stone, comprising, in combination:
   (a) container means for holding an ion diffusion bath of a molten salt in which the article is to be immersed, the bath constituting a source of ions which are to diffuse into a surface of the article so as to modify a property thereof;
   (b) means at least partially surrounding the article disposed in the container means and including at least one partition arranged for sheltering a quantity of molten salt immediately adjacent the article surface from the influence of random currents in the bath; and
   (c) means for moving molten salt between the sheltered portion of the bath immediately adjacent the article surface and the remaining portion of the bath for producing a steady flow of the molten salt immediately adjacent the article surface.

7. An arrangement as defined in claim 6 wherein said partition is made of a refractory fabric.

8. An arrangement as defined in claim 6 wherein said partition is arranged to contact the article surface only at certain locations thereof.

9. An arrangement as defined in claim 6 further comprising electric field generating means for producing an electric field through said bath and across the surface being treated in order to promote the diffusion of ions into such surface.

10. An arrangement according to claim 6 wherein the partition is separated from, essentially parallel to and within a few millimeters of the article surface.

References Cited

UNITED STATES PATENTS

| | | | |
|---|---|---|---|
| 1,959,215 | 5/1934 | Owen | 65—116 |
| 2,052,254 | 8/1936 | Shaver | 65—116 |
| 2,336,200 | 7/1943 | Von Reis | 65—116 |
| 3,218,220 | 11/1965 | Weber | 65—30 X |
| 3,486,995 | 12/1969 | Evers | 65—116 X |

FRANK W. MIGA, Primary Examiner

U.S. Cl. X.R.

65—30, 111, 116, 114, 348